United States Patent [19]

Brück

[11] Patent Number: 5,506,028
[45] Date of Patent: Apr. 9, 1996

[54] CONICAL HONEYCOMB BODY

[75] Inventor: Rolf Brück, Bergisch Gladbach, Germany

[73] Assignee: EMITEC Gesellschaft fuer Emissionstechnologie MBH, Lohmar, Germany

[21] Appl. No.: 316,642

[22] Filed: Sep. 30, 1994

Related U.S. Application Data

[63] Continuation of PCT/EP93/00639, Mar. 18, 1993.

[30] Foreign Application Priority Data

Apr. 3, 1992 [DE] Germany ............ 42 11 275.3

[51] Int. Cl.⁶ .................................................. B32B 3/12
[52] U.S. Cl. ...................... 428/116; 52/793.1; 428/188; 493/966
[58] Field of Search .................... 428/116, 188; 52/793.1; 493/966

[56] References Cited

U.S. PATENT DOCUMENTS

| 3,887,739 | 6/1975 | Kromrey ................. 428/117 X |
| 4,513,807 | 4/1985 | Rose et al. ................... 165/10 |
| 5,103,641 | 4/1992 | Maus et al. ................. 422/171 X |

FOREIGN PATENT DOCUMENTS

| 0136515 | 11/1987 | European Pat. Off. . |
| 0298943 | 1/1989 | European Pat. Off. ............. 428/116 |
| 0245737 | 8/1989 | European Pat. Off. . |
| 0245736 | 8/1989 | European Pat. Off. . |
| 0386013 | 11/1991 | European Pat. Off. . |
| 2313040 | 12/1979 | Germany . |
| 3719773 | 12/1988 | Germany . |
| 3903879 | 8/1990 | Germany . |
| 4104637 | 8/1991 | Germany . |
| 9003220 | 4/1990 | WIPO . |
| 9008249 | 7/1990 | WIPO . |
| 9012951 | 11/1990 | WIPO . |
| 9101807 | 2/1991 | WIPO . |
| 9101178 | 2/1991 | WIPO . |

*Primary Examiner*—Henry F. Epstein
*Attorney, Agent, or Firm*—Herbert L. Lerner; Laurence A. Greenberg

[57] ABSTRACT

A honeycomb body includes an axis, a jacket tube being conical relative to the axis, and a configuration being fitted in the jacket tube. The configuration includes at least one stack being wound about the axis in an involute. The stack has a plurality of sheet metal layers being layered on one another. The layers include a plurality of corrugated layers. Each of the layers has a circular ring segment shape being defined by an outer arc being approximately circular relative to a center point and an approximately circular inner arc being concentric with the outer arc and being disposed between the outer arc and the center point. Each of the corrugated layers has corrugations being oriented approximately radially relative to the center point. The corrugations have associated corrugation heights. The respective corrugation heights on each of the arcs is in a given ratio, and the arcs having lengths in a ratio being approximately equal to the given ratio.

19 Claims, 4 Drawing Sheets

CONICAL HONEYCOMB BODY

CROSS-REFERENCE TO RELATED APPLICATION

This application is a continuation of International Application Ser. No. PCT/EP93/00639, filed Mar. 18, 1993.

BACKGROUND OF THE INVENTION

1. Field of the Invention

The invention relates to a honeycomb body having an axis and having a jacket tube into which a configuration including at least one stack wound about the axis in the form of an involute is fitted, the stack having a plurality of metal sheets layered one on the other, and the plurality of sheets including a plurality of structured sheets.

The invention relates in particular to honeycomb bodies for use as carriers of a catalyst for effecting a catalytic reaction in a fluid flowing through the honeycomb body. Such use is made particularly in the exhaust system of an internal combustion engine which, for instance, drives a motor vehicle, in which the fluid is an engine exhaust gas in which reactions are to be effected by the catalyst in order to convert pollutants into unobjectionable substances.

A metal honeycomb body that is suitable as a catalyst carrier body and has layers being extended in involute fashion and being formed of smooth and corrugated sheets, is described in Published European Application No. EP 0 245 736 B1. A further development is found in Published European Application No. EP 0 245 737 B1, corresponding to U.S. Pat. Nos. 4,923,109 and 4,832,998. That disclosure describes forming the honeycomb body by wrapping the ends of a stack that is formed of smooth and corrugated sheets layered on one another, in an S shape about an axis, by means of which two approximately involute structures that are wound around one another are produced. Another feature of the honeycomb body with layers aligned in involute fashion is found in Published International Application WO 90/03220, corresponding to U.S. Pat. No. 5,135,794. In that disclosure, stacks of metal sheets, some of which are structured and which are folded at a bending line are wound around one another and around an axis aligned parallel to the bending lines. The honeycomb bodies described in those three references are usable in particular as carriers for catalysts in motor vehicle exhaust systems and further details may be found in those references.

In order to reach a sufficient efficiency of the catalysts on honeycomb bodies in exhaust systems of motor vehicles, honeycomb bodies having cross sections which are equal the cross sections of the exhaust gas pipes, through which the exhaust gases flow from the internal combustion engines to the honeycomb bodies or away form the honeycomb bodies, are usually not sufficient. Accordingly, diffusers have to be provided in front of honeycomb bodies and confusers behind honeycomb bodies in exhaust gas systems of motor vehicles, in order to adjust the cross sections of exhaust gas pipes and honeycomb bodies to each other. Details thereof are found in Published European Application EP 0 386 013 B1, corresponding to U.S. Pat. No. 5,150,573. That reference also gives a detailed explanation of the problems of a steady inflow of a honeycomb body carrying a catalyst. In order to improve the inflow, a flow guide body with a shape adapted to the shape of the diffuser or confuser, which means a conical shape, should be inserted in the diffuser in front of and/or in the confuser behind a honeycomb body. Such a flow guide body may possibly be a honeycomb body itself and can, for example, be formed of spiral windings of a corrugated and slit metal sheet. Other possibilities for forming the conical honeycomb body amount to an assembly of numerous homogeneous, conical, pipe-shaped elements. The conical honeycomb body which mainly serves as a flow guide body can additionally receive a catalytically effective coating itself, in order to serve as a "precatalyst", besides the cylindrical honeycomb body having a catalyst which is still supposed to carry the main load of the catalytic conversion. Since the flow guide body usually contains considerably less mass than the cylindrical honeycomb body, it heats up faster at start-up and a catalyst located on it can become effective during an especially short period of time.

According to German Patent DE 23 13 040 C3, corresponding to U.S. Pat. No. 3,907,708, a slightly conical honeycomb body can be built by pressing a cylindrical structure, which forms a layer of flat and corrugated metal sheets.

Published International Application WO 90/08249, corresponding to U.S. Pat. No. 5,157,010; Published European Application EP 0 298 943 A2; Published International Application WO 91/01178, corresponding to co-pending U.S. application Ser. No. 711,564, filed May 30, 1991 and application Ser. No. 900,836, filed Jun. 18, 1992; Published International Application WO 91/01807, corresponding generally to U.S. Pat. Nos. 5,045,403 and 5,130,208; and Published European Application EP 0 136 515 B1, relate to the formation of microstructures in metal sheets from which honeycomb bodies are intended to be formed. Examples of such microstructures are flutes, beads, bumps, grooves, or small pieces of the surface protruding from the metal sheets. They are generally markedly smaller than the corrugations that are understood in professional circles to be made in "corrugated" sheets for producing honeycomb bodies. The microstructures serve various purposes. They can contribute to improving the strength of a honeycomb body, if the body is constructed in such a way that the microstructures intermesh. The microstructures may also serve, optionally in addition to that function, to influence the flow behavior of a fluid passing through a honeycomb body.

German Published, Non-Prosecuted Application DE 39 03 879 A1 discloses a metal honeycomb body which is disposed in the closed gas loop of a laser, is intended to trip certain catalytic reactions in the gas required for operating the laser and is electrically heatable.

Electrically heatable honeycomb bodies are also usable in motor vehicle exhaust systems. That can be learned, for instance, from Published International Application WO 90/12951, which moreover describes a further function of microstructures in metal sheets from which an electrically heatable honeycomb body is made. The microstructures serve the purpose of providing a form-locking connection of two metal sheets, between which an electrically insulating intermediate layer of ceramic or the like is inserted. A form-locking connection is one which connects two elements together due to the shape of the elements themselves, as opposed to a force-locking connection, which locks the elements together by force external to the elements. German Published, Non-Prosecuted Application DE 37 19 773 A1 discloses a carrier body for a catalytic reactor for exhaust gas cleaning, which is conical in structure and is associated with a likewise conical jacket tube.

SUMMARY OF THE INVENTION

It is accordingly an object of the invention to provide a conical honeycomb body, which overcomes the hereinaforementioned disadvantages of the heretofore-known devices of this general type, which is simple in structure and easy to produce, which can be inserted by way of example into a diffuser or a confuser associated with a typical, axially straight honeycomb body, and which can serve, when coated with a catalyst, as a precatalyst for a typical honeycomb body having a catalyst coating.

With the foregoing and other objects in view there is provided, in accordance with the invention, a honeycomb body, comprising an axis; a jacket tube being conical relative to the axis; and a configuration being fitted in the jacket tube, the configuration including at least one stack being wound about the axis in an involute, the stack having a plurality of sheet metal layers being layered on one another, the layers including a plurality or majority of corrugated layers, each of the layers having a circular ring segment shape being defined by an outer arc being approximately circular relative to a center point and an approximately circular inner arc being concentric with the outer arc and being disposed between the outer arc and the center point, each of the corrugated layers having corrugations being oriented approximately radially relative to the center point, the corrugations having associated corrugation heights, the respective corrugation heights on each of the arcs being in a given ratio, and the arcs having lengths in a ratio being approximately equal to the given ratio.

Among other features, the honeycomb body according to the invention is characterized by the fact that it is formed of at least one stack of metal sheets, so that its production no longer requires a spiral winding of complicatedly shaped and possibly slit metal sheets. That kind of spiral winding of a conical body is difficult, because the sheets to be wound into a conical body can no longer be straight but must instead be curved and sometimes overlap one another several times. Accordingly, conical honeycomb bodies have been unable to gain virtually any industrial significance, because of the complicated production technique. Since a stack layered from a plurality of sheets is formed to produce the honeycomb body according to the invention, the problem of production is simplified considerably. The sheets to be furnished for forming the stack are relatively short and can be cut or stamped inexpensively from larger sheet-metal panels, producing only little waste. The honeycomb body according to the invention can also be constructed in such a way that each sheet abuts the jacket tube at one of its ends and is secured to the jacket tube, such as by being brazed to it. This is especially important for a honeycomb body with a conical shape, because the strains remaining in the wound stack of metal sheets tend to force the sheet-metal stack out of the conical jacket tube to a certain extent. However, that tendency can be counteracted in a simple and adequate manner by individually joining each sheet to the jacket tube.

In order to form a conical honeycomb body with end surfaces oriented at right angles to the axis and with these end surfaces being substantially flat, the form of each sheet must deviate slightly from the ideal shape of a circular ring segment. Since the sheets in the vicinity of the honeycomb body axis are inclined less than those in the vicinity of the jacket tube, the regions of the sheets that come to be located in the vicinity of the axis must have a somewhat lesser width than the regions that come to be located in the vicinity of the jacket tube. If sheets are used which have a shape that is substantially equivalent to the ideal form of a circular ring segment, then a honeycomb body with end surfaces that bulge slightly outward results. It is understood that the invention includes both honeycomb bodies with substantially flat end surfaces and those with slightly bulging end surfaces.

The corrugation of a corrugated sheet to be used according to the invention cannot have a corrugation height that is constant over the entire sheet. Instead, the corrugation height must increase, beginning at a lesser corrugation height at the smaller arc defining the sheet, to a larger corrugation height on the larger arc defining the sheet. The ratio of the corrugation heights must be approximately equivalent to the ratio of the length of the arcs, so that an approximately conical honeycomb body is produced when the sheet is intertwined.

In accordance with another feature of the invention, the corrugation height varies or merges steadily, and preferably linearly, from the smaller arc to the larger arc. This kind of corrugation is especially suitable for forming a conical honeycomb body. It is not absolutely necessary to provide a sheet with slits in addition to the corrugation, as is done in Published European Application EP 0 386 013 B1, corresponding to U.S. Pat. No. 5,150,573. In order to form a structured corrugation as described above, a previously flat sheet, optionally shaped in the manner of a circular ring, may be given the corrugation between two conical corrugating rollers.

In accordance with a further feature of the invention, each corrugation at an outer arc merges with a single corrugation at the respective inner arc. In the context of this embodiment it is possible to produce a corrugated sheet that corresponds to a segment of a given circular ring, by corrugating a smooth sheet that is a correspondingly longer segment of the same circular ring. The corrugation heights at the inner and outer arcs then merge substantially linearly with one another. The result is a considerable advantage in production, because the only sheets required are those in the form of segments of a single circular ring.

In accordance with an added feature of the invention, each corrugation at the outer arc in every corrugated sheet merges with a plurality of corrugations on the inner arc. This advantageously occurs in such a way that a single corrugation on the outer arc splits into a plurality of corrugations, in particular two to three corrugations, on the inner arc. Given a suitable selection of the cone shape to be formed and of the number of corrugations on the inner arc with which a single corrugation on the outer arc merges, a sheet that is corrugated in this way may be formed from a straight sheet, by corrugating this straight sheet between two suitably structured conical corrugating rollers. The advantage that results from this is essentially that both smooth and corrugated sheets for forming the honeycomb body can each be made in a single operation. The smooth sheets may be cut or stamped out of larger sheet-metal panels, and the corrugated sheets are produced by corresponding corrugations of a straight strip of sheet metal which can be made in a practically arbitrary length, as is well known.

In accordance with an additional feature of the invention, which can optionally lead to other embodiments, there are provided intermeshing microstructures in the smooth and corrugated sheets that form the honeycomb body.

In accordance with yet another feature of the invention, the microstructures are flutes aligned at an angle, preferably approximately a right angle, to the axis, wherein the flutes mesh with bumps and/or other microstructures in adjacent sheets. The microstructures lend the honeycomb body a certain dimensional stability even before a brazing process, which as a rule is carried out to join the sheets to one another and/or to the jacket tube, and they lessen the possibility that the intertwined configuration of sheets will snap out of the conical jacket tube. In the case of brazing or the like, the microstructures may also serve as anchoring points for brazing material and thus promote the creation of especially heavy-duty brazing points in the honeycomb body. Moreover, the microstructures may have an advantageous effect on the flow of a fluid through the honeycomb body and in a honeycomb body constructed for an electric heater, they may provide form-locking connections between the sheets and the ceramic insulating layers or the like.

In accordance with yet a further feature of the invention, the configuration has first and second end surfaces being oriented approximately at right angles to the axis, the first end surface is larger than the second end surface, and the jacket tube extends as far as the first end surface and has at least one retaining structure resting on the first end surface. The mechanical strength of a conical honeycomb body according to the invention can be further improved by the provision of a retaining structure on the jacket tube, without hindrance to other provisions. This retaining structure can retain the intertwined configuration of sheets in the conical jacket tube and prevent them from snapping out, especially when there are no form-locking connections such as brazing points between the sheets and the jacket tube.

In accordance with yet an added feature of the invention, the retaining structure is a lip disposed on the jacket tube and preferably completely surrounding it. Such a lip can be formed, for instance, by a crimp of the jacket tube, or it may be a separate component that is welded on.

In accordance with yet an additional feature of the invention, the retaining structure is a strap fitting over the end surface and being joined to the jacket tube by material adhesion, particularly welding. Such a strap is advantageously centered on the end surface so that it touches the center point of the end surface.

The honeycomb body according to the invention, of whatever structure, is especially suitable as a carrier for a catalyst for effecting a catalytic reaction in the fluid flowing through it. It can especially be used for this purpose in the exhaust system of a motor vehicle, so that the exhaust gas of an internal combustion engine flows through it and it can trip catalytic reactions in this exhaust gas to eliminate pollutants. The honeycomb body according to the invention is especially suitable as a "precatalyst" for a honeycomb body of a known type. It is then disposed in a diffuser of the exhaust system immediately upstream of the known honeycomb body.

Other features which are considered as characteristic for the invention are set forth in the appended claims.

Although the invention is illustrated and described herein as embodied in a conical honeycomb body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
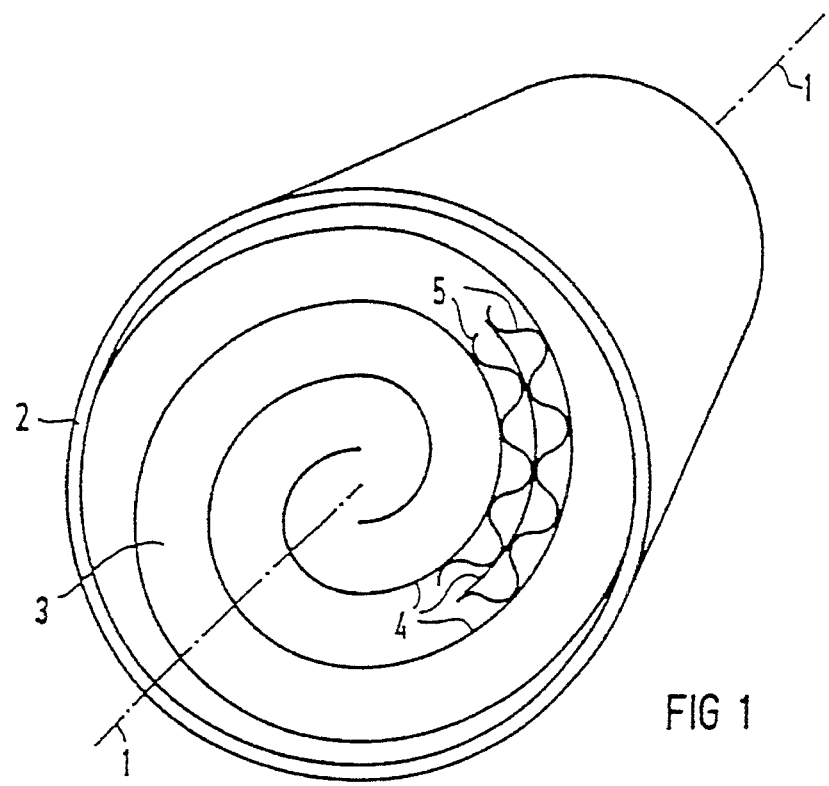
FIG. 1 is a diagrammatic, end perspective view of a conical honeycomb body according to the invention.

Referring now in detail to the figures of the drawing, in which components that perform the same functions are each provided with the same reference numeral, and which are partially diagrammatic and/or slightly exaggerated in order to emphasize specific characteristics of the invention, and first, particularly, to FIG. 1 thereof, there is seen a honeycomb body according to the invention. This honeycomb body is conical with respect to an axis 1 and has a stack 3 intertwined in an S shape and fitting into a conical jacket tube 2. This stack 3 includes smooth metal sheets 4 and corrugated metal sheets 5. The number of sheets or sheet metal layers 4, 5 that is shown is in no way representative of particularly advantageous embodiments. In order to produce a honeycomb body with a stack 3 intertwined in an S shape, and in general in order to make honeycomb bodies having at least one stack 3 which is intertwined in the manner of an involute, reference is expressly made to the prior art discussed in detail above.

Figure 2:
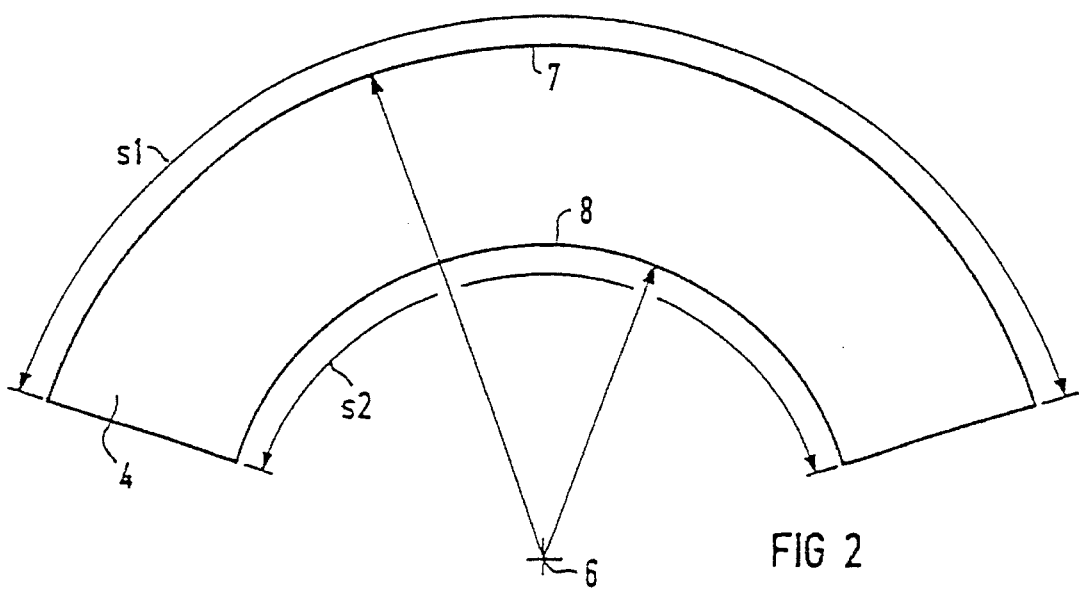
FIG. 2 is an elevational view of a smooth sheet for forming the honeycomb body.

FIG. 2 shows an example of a smooth sheet 4 that is spread out flat and with which a honeycomb body according to the invention can be produced. The sheet 4 has the form of a circular ring segment and is defined by an outer arc 7 having a length s1 and an inner arc 8 having a length s2 and being concentric to the outer arc 7 with respect to a center point 6. The sheet 4 which is shown thus corresponds to a view of the conical surface developed into a plane. By intertwining this sheet 4 together with other sheets, a conical honeycomb body can accordingly obtained.

Figure 3:
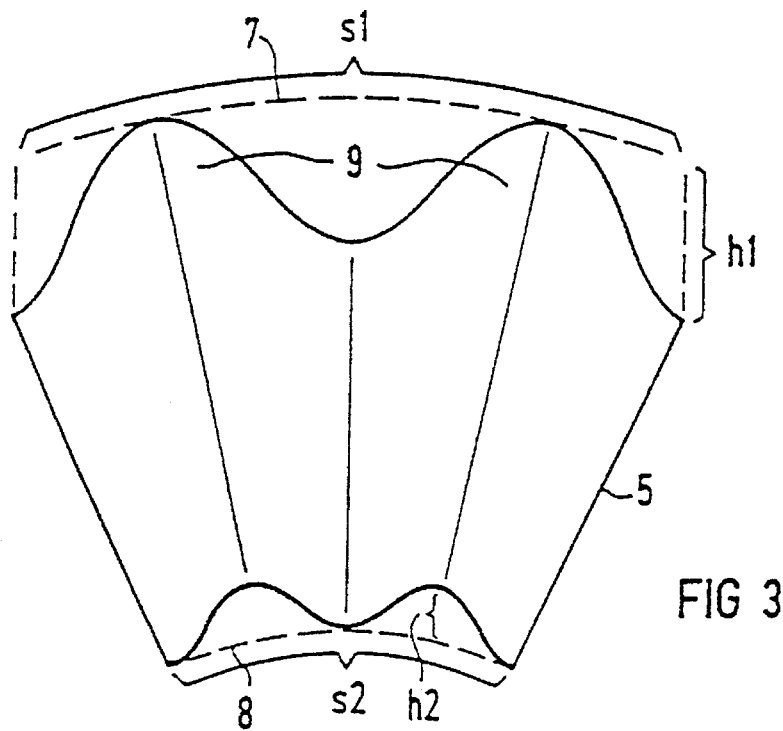
FIGS. 3, 4 and 5 are fragmentary, perspective views showing portions of corrugated sheets to be used according to the invention.
Figure 4:
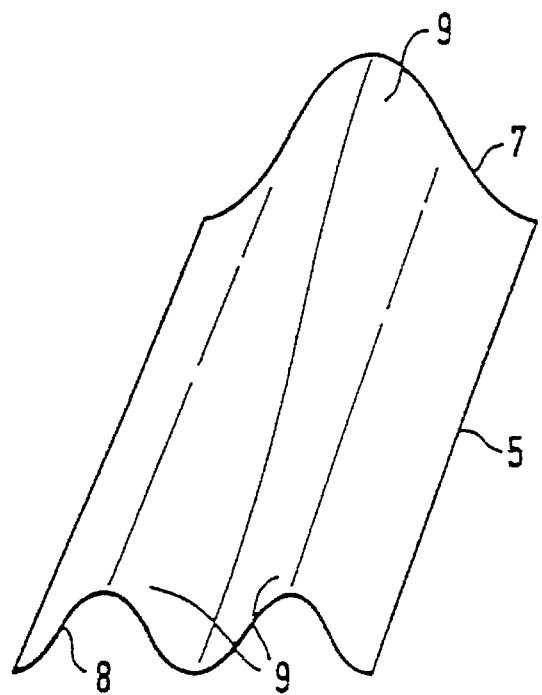
Figure 5:
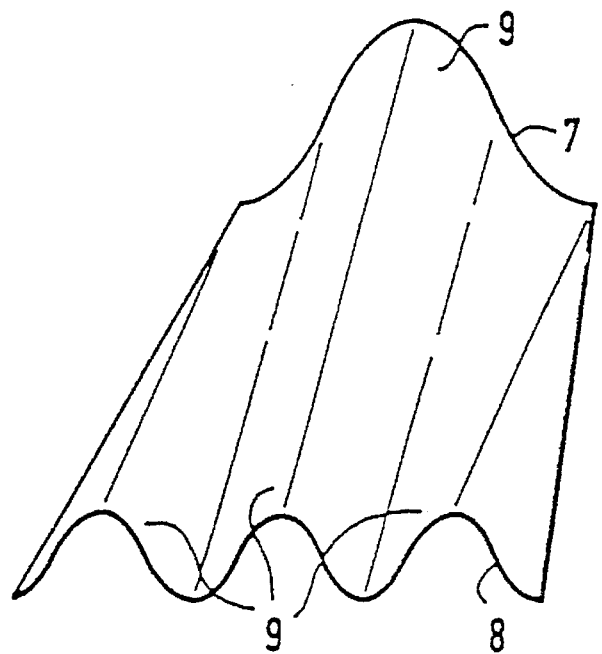

FIGS. 3, 4 and 5 show portions of corrugated sheets 5 for forming honeycomb bodies according to the invention. The sheet of FIG. 3 has corrugations 9 and each corrugation 9 on the outer arc 7 merges with a single corrugation 9 on the inner arc 8. This kind of sheet 5 has advantages in terms of the fact that it can be formed from a smooth sheet by corrugating it between suitable conical corrugating rollers, or by deep-drawing. The smooth sheet is a segment of the same circular ring of which the corrugated sheet 5 represents one segment. FIG. 3 shows the respective lengths s1 and s2 of the outer arc 7 and inner arc 8 as well as corrugation heights h1 and h2 on the outer arc 7 and inner arc 8. As already noted, the corrugation height h1 on the outer arc 7 must be greater than the corrugation height h2 on the inner arc 8, corresponding to the ratio between the length s1 of the outer arc 7 and the length s2 of the inner arc 8.

FIG. 4 and FIG. 5 show variants of corrugated sheets 5. In FIG. 4, one corrugation 9 on the outer arc 7 changes into two corrugations 9 on the inner arc 8. In FIG. 5, three corrugations 9 are produced on the inner arc 8 from a single corrugation 9 on the outer arc 7. Corrugated sheets 5 that are structured in this way, given a suitable selection of the ratio of sizes of the honeycomb body to be formed, may under some circumstances be produced by corrugating straight, smooth sheets between suitably structured conical corrugating rollers. Accordingly, straight sheets of the kind available on the market which are wound onto large drums can be used to form these corrugated sheets 5.

Figure 6:
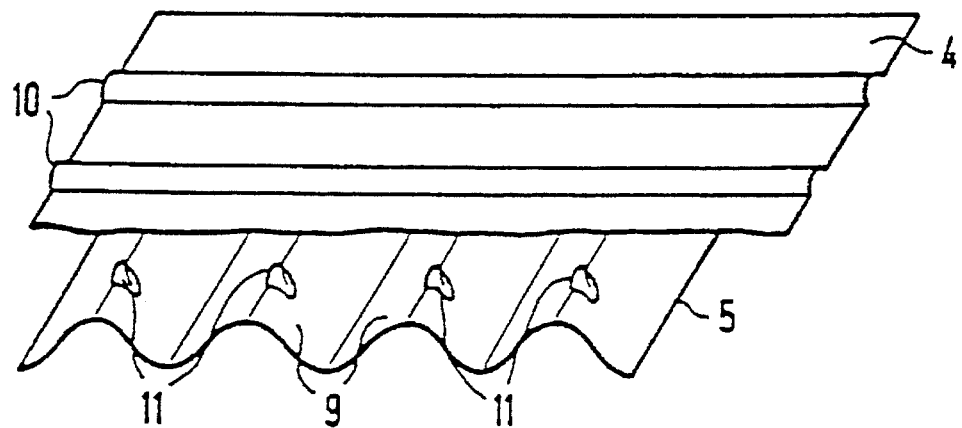
FIG. 6 is a fragmentary, perspective view showing sheets with intermeshing microstructures.

FIG. 6 shows the cooperation of microstructures 10, 11 for fixing a smooth sheet 4 to a corrugated sheet 5. The smooth sheet 4 has flutes 10, which are aligned approximately at right angles to the corrugations 9 of the corrugated sheet 5. The corrugated sheet 5 is provided with bumps 11, which engage the flutes 10 of the smooth sheet 4 and can accordingly fix the two sheets 4, 5 to one another to a certain extent. Instead of the bumps 11, the corrugated sheet 5 and the smooth sheet 4 may both be provided with flutes 10. Examples of this can be found in the aforementioned prior art.

Figure 7:
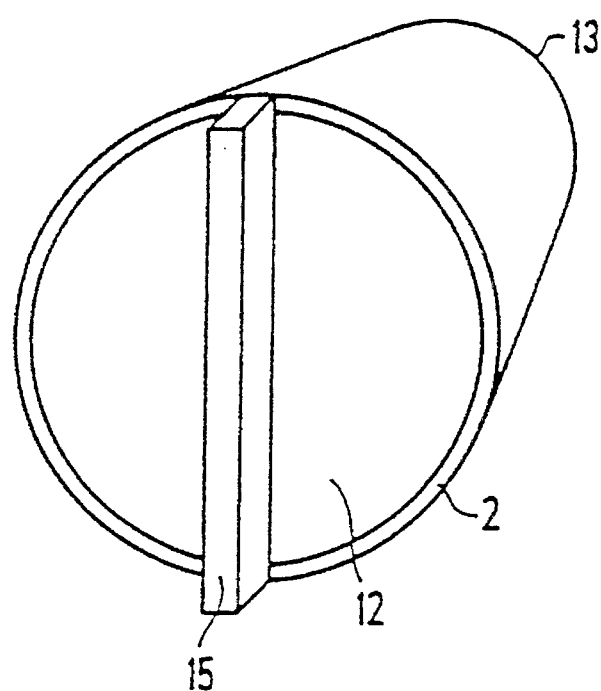
FIG. 7 is an end perspective view of a conical honeycomb body with an additional retaining structure.

FIG. 7 shows the way in which a conical honeycomb body according to the invention can be stabilized by means of an additional retaining structure. The conical honeycomb body encompassed by the jacket tube 2 has first and second substantially flat end surfaces 12 and 13. The first end surface 12 is larger than the second end surface 13, and both end surfaces 12, 13 are oriented approximately at right angles to the conical jacket tube 2. In order to keep the intertwined stack (which is not shown in FIG. 7 for the sake of clarity) inside the jacket tube 2, a strap, hoop or stay 15 is placed across the first end surface 12 and joined to the jacket tube 2 at two opposed points, particularly by welding. The strap 15 thus prevents the stack from snapping out of the jacket tube 2.

Figure 8:
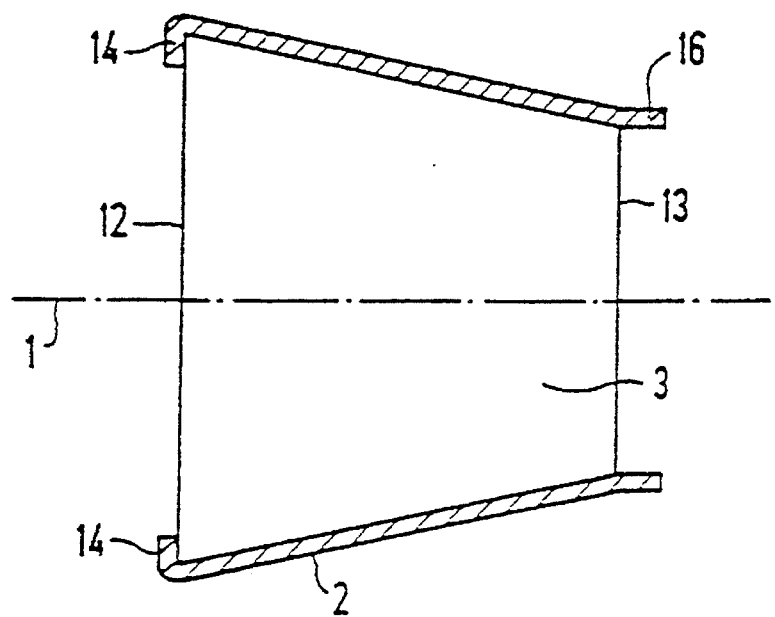
FIG. 8 is a longitudinal-sectional view of a further honeycomb body according to the invention with an additional retaining structure.

FIG. 8 shows a further exemplary embodiment of an additional retaining structure on a conical honeycomb body. This figure is a longitudinal section taken parallel to the axis 1. The configuration with the stack 3 is bounded, in the direction of the axis 1, by the larger first end surface 12 and the smaller second end surface 13. The stack 3 is located in the jacket tube 2. In order to fix the stack 3 in place, the jacket tube 2 has a lip 14 that rests on the first end surface 12 and rings the axis 1. This lip 14 may be a simple crimping of the jacket tube 2, or an additional component that is welded to the jacket tube 2. Since the configuration to be introduced into the jacket tube 2 has a certain elasticity before form-locking connections are made in it, it can be slipped past the lip 14 into the jacket tube 2 in a slightly compressed form and then once it has been completely introduced it engages the lip 14 from behind, and the lip thus prevents it from snapping out of the jacket tube 2. At the second end surface 13, the jacket tube 2 ends in an axial flange 16, on which a further tube can be secured as needed, for instance by welding.

The conical honeycomb body of the invention is simple in structure and easily manufactured, and when introduced into a diffuser associated with a conventional, axially straight honeycomb body, it is especially suitable as a "precatalyst". A catalyst material is carried by the configuration for effecting a catalytic reaction in a fluid flowing through the honeycomb body.

I claim:

1. A honeycomb body, comprising an axis; a jacket tube being conical relative to said axis; and a configuration being fitted in said jacket tube, said configuration including at least one stack being wound about said axis in one of an S-shape and an involute, said stack having a plurality of sheet metal layers being layered on one another, said layers including a plurality of corrugated layers, each of said layers having a circular ring segment shape being defined by an outer arc being approximately circular relative to a center point and an approximately circular inner arc being concentric with said outer arc and being disposed between said outer arc and the center point, each of said corrugated layers having corrugations being oriented approximately radially relative to the center point, said corrugations having associated corrugation heights, said respective corrugation heights on each of said arcs being in a given ratio, and said arcs having lengths in a ratio being approximately equal to said given ratio.

2. The honeycomb body according to claim 1, wherein said corrugation heights of said corrugations merge steadily with one another in each of said corrugated layers.

3. The honeycomb body according to claim 1, wherein said corrugation heights of said corrugations merge linearly with one another in each of said corrugated layers.

4. The honeycomb body according to claim 1, wherein each of said corrugations on said outer arc merges with a single one of said corrugations on said inner arc.

5. The honeycomb body according to claim 1, wherein each of said corrugations on said outer arc merges with a plurality of said corrugations on said inner arc.

6. The honeycomb body according to claim 1, wherein said layers have intermeshing microstructures.

7. The honeycomb body according to claim 6, wherein at least some of said microstructures include flutes being aligned at an angle relative to said axis, and said flutes engage each other.

8. The honeycomb body according to claim 7, wherein flutes are aligned approximately at a right angle, relative to said axis.

9. The honeycomb body according to claim 6, wherein at least some of said microstructures include flutes being aligned at an angle relative to said axis, at least some of said microstructures include bumps, and said flutes engage each other and said bumps.

10. The honeycomb body according to claim 9, wherein flutes are aligned approximately at a right angle, relative to said axis.

11. The honeycomb body according to claim 6, wherein at least some of said microstructures include flutes being aligned at an angle relative to said axis, at least some of said microstructures include bumps, and said flutes engage said bumps.

12. The honeycomb body according to claim 11, wherein flutes are aligned approximately at a right angle, relative to said axis.

13. The honeycomb body according to claim 1, wherein said configuration has first and second end surfaces being oriented approximately at right angles to said axis, said first end surface is larger than said second end surface, and said jacket tube extends as far as said first end surface and has at least one retaining structure resting on said first end surface.

14. The honeycomb body according to claim 13, wherein said at least one retaining structure is a lip on said jacket tube.

15. The honeycomb body according to claim 14, wherein said lip extends all the way around said jacket tube.

16. The honeycomb body according to claim 13, wherein said retaining structure is a strap being joined to said jacket tube by material adhesion.

17. The honeycomb body according to claim 13, wherein said retaining structure is a strap being welded to said jacket tube.

18. The honeycomb body according to claim 13, wherein said retaining structure is a strap being joined to said jacket tube by material adhesion and being centered on said first end surface.

19. The honeycomb body according to claim 1, including a catalyst carried by said configuration for effecting a catalytic reaction in a fluid flowing through the honeycomb body.

* * * * *